US012774881B2

(12) United States Patent
Zhu et al.

(10) Patent No.: US 12,774,881 B2
(45) Date of Patent: Oct. 27, 2026

(54) MULTI-PURPOSE CONFOCAL SENSOR SYSTEMS

(71) Applicant: Applied Materials, Inc., Santa Clara, CA (US)

(72) Inventors: Zhaozhao Zhu, Milpitas, CA (US); Jon Meyer, Fremont, CA (US); Varoujan Chakarian, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 177 days.

(21) Appl. No.: 18/425,460

(22) Filed: Jan. 29, 2024

(65) Prior Publication Data

US 2025/0244122 A1 Jul. 31, 2025

(51) Int. Cl.
*G01B 11/06* (2006.01)

(52) U.S. Cl.
CPC .................................... *G01B 11/06* (2013.01)

(58) Field of Classification Search
CPC ...................................................... G01B 11/06
See application file for complete search history.

(56) References Cited

U.S. PATENT DOCUMENTS

2013/0162972 A1* 6/2013 Sesko .................. G01B 21/045 356/4.05
2013/0222815 A1* 8/2013 Patzwald ........... G01B 11/0608 356/612
2017/0010452 A1* 1/2017 Patzwald ............. G01B 11/026
2017/0115112 A1* 4/2017 Srocka ............... G01B 11/0625
2018/0203119 A1* 7/2018 Kern ..................... G01B 21/042
2019/0360796 A1* 11/2019 Fujimoto ............. G01B 11/272
2020/0378747 A1* 12/2020 Sesko ................... G01J 3/0208
2022/0196388 A1* 6/2022 Laman ............... G01B 11/0608
2023/0155159 A1* 5/2023 Park ....................... G01B 11/06 29/730

OTHER PUBLICATIONS

Polytec, "Chromatic confocal technology", https://www.polytec.com/us/surface-metrology/technology/chromatic-confocal-technology, retrieved from the internet on Jan. 3, 2024, 3 pages.

* cited by examiner

*Primary Examiner* — Dominic J Bologna
(74) *Attorney, Agent, or Firm* — Lowenstein Sandler LLP

(57) ABSTRACT

A method includes causing, by at least one processing device, a confocal sensor system to make a plurality of signal measurements of a target material, each signal measurement of the plurality of signal measurements corresponding to a respective distance of a plurality of distances between a confocal sensor of the confocal sensor system and the target material, generating, by the at least one processing device, target scan data for the target material based on the plurality of signal measurements, and measuring, by the at least one processing device, at least one property of the target material based on the target scan data.

20 Claims, 6 Drawing Sheets

MULTI-PURPOSE CONFOCAL SENSOR SYSTEMS

TECHNICAL FIELD

The present disclosure relates generally to electronic device fabrication, and, more particularly, relates to multi-purpose confocal sensor systems.

BACKGROUND

Metrology is the science of measuring and analyzing properties of materials. For example, in the context of electronic device fabrication (e.g., semiconductor device fabrication), metrology equipment can be used to measure properties of substrates or wafers (e.g., physical and electrical properties). By doing so, metrology equipment can be used to measure material thicknesses, measure feature sizes, detect material defects that may negatively affect electronic device performance (e.g., surface particles or pattern flaws), verify that target properties of a device being manufactured are being met, etc.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes causing, by at least one processing device, a confocal sensor system to make a plurality of signal measurements of a target material, each signal measurement of the plurality of signal measurements corresponding to a respective distance of a plurality of distances between a confocal sensor of the confocal sensor system and the target material, generating, by the at least one processing device, target scan data for the target material based on the plurality of signal measurements, and measuring, by the at least one processing device, at least one property of the target material based on the target scan data.

In another aspect of the disclosure, a system includes a memory and a processing device, operatively coupled to the memory, to perform operations including causing a confocal sensor system to make a plurality of signal measurements of a target material, each signal measurement of the plurality of signal measurements corresponding to a respective distance of a plurality of distances between a confocal sensor of the confocal sensor system and the target material, generating target scan data for the target material based on the plurality of signal measurements, and measuring at least one property of the target material based on the target scan data.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
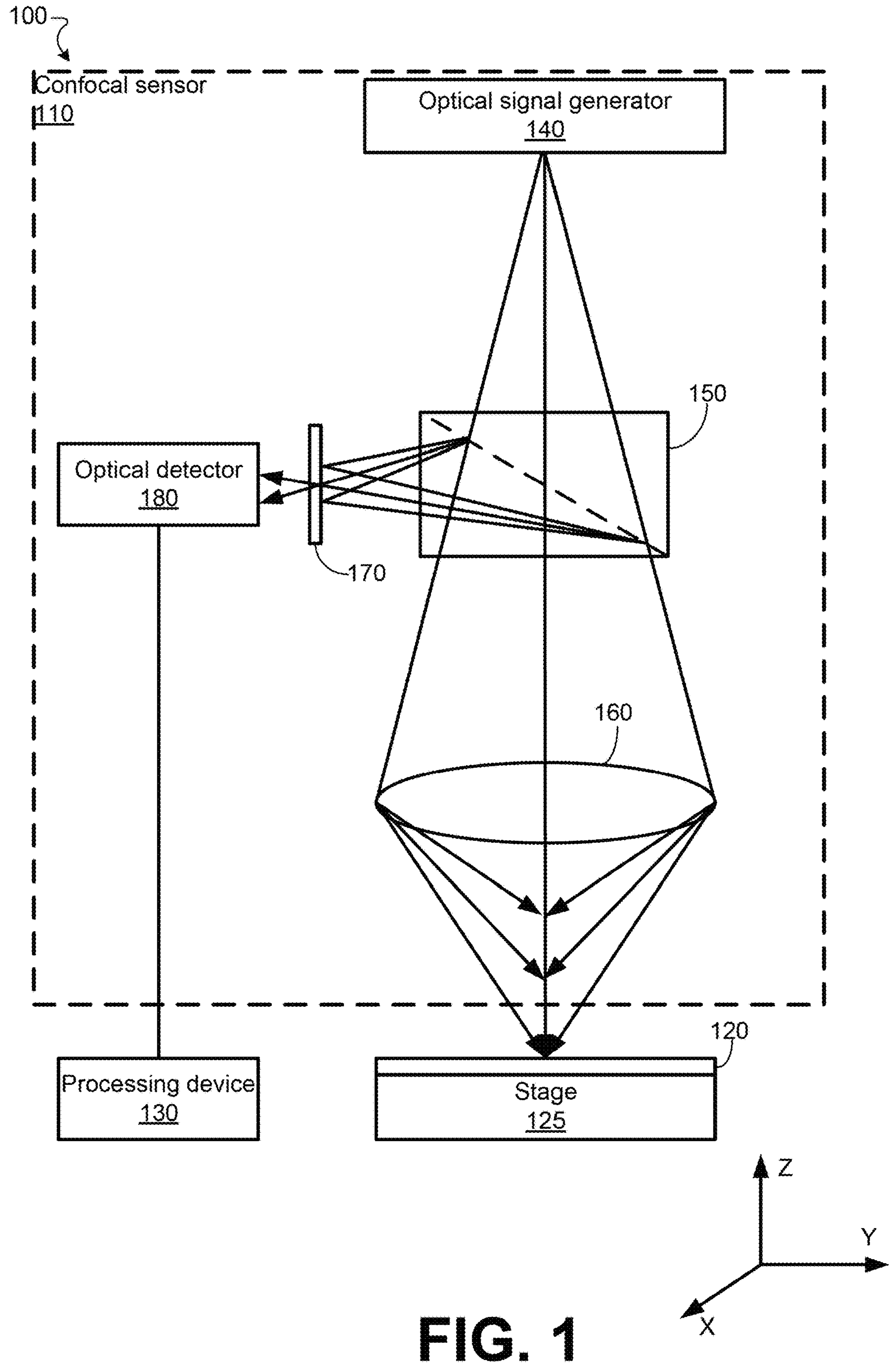
FIG. 1 is a diagram of an example multi-purpose confocal sensor system, according to some embodiments.

Embodiments described herein relate to multi-purpose confocal sensor systems. Some sensor systems can make distance (e.g., displacement) measurements corresponding to a distance between a target material and a reference position (e.g., an optical detector of the sensor system). A target material can be, or be disposed on, a substate. For example, the substrate can be a semiconductor wafer ("wafer").

One type of sensor system is a confocal sensor system. Generally, confocal sensor systems can make measurements by exploiting chromatic aberration. For example, a confocal sensor can include a beam splitter to split a multi-wavelength optical signal (e.g., polychromatic signal such as white light) into multiple single wavelength optical signals (e.g., monochromatic signals or colors), and a lens to direct the single wavelength optical signals toward a target material. An optical detector, such as a spectrometer, can be used to detect an optical signal having a particular wavelength (e.g., color).

Confocal sensor systems can have numerous benefits over other types of sensor systems that can be used to make measurements (e.g., displacement measurements). For example, a confocal sensor system can have lower angular sensitivity. As another example, a confocal sensor system may not be sensitive to specific wavelengths. As yet another example, measurements made by a confocal sensor system can be relatively repeatable and accurate in many cases. Alternative types of confocal sensor systems may be more expensive to implement than confocal sensor systems, and can have technical drawbacks that make them less suitable to use than confocal sensor systems. A confocal sensor system can be used to measure displacement of target materials on a small scale (e.g., within tens of nanometers (nm)).

A target material (e.g., substrate) can have multiple properties. Examples of properties include thickness, distance (e.g., displacement), etc. For example, wavelengths of signals detected by the optical detector can be mapped to respective distances. Some confocal sensors can measure each property of a target material on an individual basis. Additionally, in order to measure both thickness and distance of a substrate, a sensor system can include a distance measurement system and a reflectometer system. Such systems can be more difficult to integrate and can increase system footprint.

Embodiments described herein can overcome these and other drawbacks of other measurement techniques by implementing multi-purpose confocal sensor systems. A confocal sensor system described herein can measure multiple properties of a target material of a substrate (e.g., wafer) using a single confocal sensor. Examples of properties include thickness, distance, etc. The substrate can be disposed on a stage, which can move the substrate relative to the confocal sensor with multiple degrees of freedom (e.g., at least three degrees of freedom). For example, a first degree of freedom can be in the direction perpendicular to the substrate plane (e.g., vertical axis), and the other two degrees of freedom can be orthogonal in the wafer plane. For example, the first degree of freedom can correspond to the z-axis in a Cartesian coordinate system, and the other two degrees of freedom can correspond to the x-axis and the y-axis.

To measure multiple properties of a substrate (e.g., wafer), a processing device (e.g., controller) of the confocal sensor system can implement a scanning method that allows the confocal sensor to be adopted for thickness measurement, which can be used in addition to distance measurement. More specifically, while the substrate is being scanned in the direction perpendicular to the plane of the substrate (e.g., along a vertical axis or z-axis), the confocal sensor signal can change due to the reflectivity of the substrate (which in turns is changing as a function of its thickness). The motion along the direction perpendicular to the plane of the substrate can have a constant or near-constant velocity, which can be controlled by moving the confocal sensor and/or the substrate. The confocal sensor can be used to collect data at an approximately fixed sample rate to ensure equal-distant sampling as the position along the direction perpendicular to the plane of the substrate is changing. After the scan is done, the processing device can use the confocal sensor signal to determine the reflectivity of the target material, which can be used to determine thickness, distance, etc.

Embodiments described herein can provide various technical benefits. For example, embodiments described herein can enable multiple properties of substrates (e.g., thickness and distance) to be measured by the same confocal sensor system, which can reduce footprint, measurement time, and computational resources to make measurements.

FIG. 1 is a diagram of an example multi-purpose confocal sensor measurement system ("system") 100, according to some embodiments. System 100 can include confocal sensor 110, target material 120, and at least one processing device 130. Target material 120 can correspond to a layer, which can be a substrate or a layer formed on a substrate. In some embodiments, target material 120 is a thin layer of material. In some embodiments, target material 120 has a thickness that ranges from about 0.2 micrometer (μm) to about 20 μm. In some embodiments, target material 120 has a thickness that is less than or equal to about 20 nm. In some embodiments, target material 120 has a thickness that is less than or equal to about 10 nm.

As shown, target material 120 can be disposed on stage 125. Stage 125 can move target material 120 with multiple degrees of freedom relative to confocal sensor 110. More specifically, stage 125 can move target material 120 with at least three degrees of freedom relative to confocal sensor 110. For example, as shown in FIG. 1, the three degrees of freedom can be represented by the three-dimensional Cartesian coordinates (x, y and z) with respect to an x-axis, a y-axis and a z-axis. As another example, the three degrees of freedom can be represented by spherical coordinates including a radial distance defining a radial line, a polar angle, and an azimuthal angle. As yet another example, the three degrees of freedom can be represented by cylindrical coordinates including a radial distance, an azimuthal angle, and a height.

Confocal sensor 110 can include optical signal generator 140 to generate an optical signal. In some embodiments, at least one processing device 130 causes optical signal generator 140 to generate the optical signal. The optical signal generated by optical signal generator 140 is a multi-wavelength optical signal. For example, the optical signal can be a polychromatic signal (e.g., white light). Any suitable optical signal generator can be used to implement optical signal generator 140 in accordance with embodiments described herein. In some embodiments, optical signal generator 140 includes a white light source. In some embodiments, optical signal generator 140 is a component of confocal sensor 110. In some embodiments, optical signal generator 140 is a standalone component of system 100.

Confocal sensor 110 can further include beam splitter 150 and at least one lens 160. In some embodiments, beam splitter 150 is a cube beam splitter. In some embodiments, beam splitter 150 is a plate beams splitter. At least one lens 160 is used to separate the optical signal into single wavelength signals that are incident on target material 120. For example, if the optical signal is a polychromatic signal (e.g., white light), then a single wavelength signal can be a monochromatic signal having a single wavelength corresponding to a color.

In some embodiments, confocal sensor 130 includes at least one confocal spectral filter 170 that is used to filter out out-of-focus light. Each confocal spectral filter can include an aperture (e.g., pinhole) through which a portion of an optical signal can pass through. For example, a first confocal spectral filter can filter the optical signal generated by optical signal generator 140, and a second confocal spectral filter can filter incident optical signals reflected off of target material 120. In some embodiments, at least one confocal spectral filter 170 includes an excitation filter.

Confocal sensor 110 can include optical detector 180 (e.g., spectrometer) that can be used to detect signals reflected from target material 120. More specifically, optical detector 180 can detect wavelengths of incident optical signals reflected from the surface of target material 120.

At least one processing device 130 can measure at least one property of target material 120 based on a confocal signal detected by optical detector 180. More specifically, the confocal signal can include the portion of the reflected optical signal. For example, the measurement can be made based on signal intensity.

In some embodiments, the property being measured is thickness of target material 120. More specifically, at least one processing device 130 can cause a scan of target material 120 along the direction perpendicular to the plane of target material 120 (e.g., the vertical axis or z-axis) to be performed. The scan can be performed at a constant or near-constant velocity along the direction perpendicular to the plane of target material 120. For example, at least one processing device 130 can cause stage 125 to move target material 120 at a constant or near-constant velocity relative to confocal sensor 110 along the direction perpendicular to the plane of target material 120). The confocal signal detected by optical detector 180 will change due to the reflectivity of target material 120, with the reflectivity of target material 120 changing as a function of thickness of target material 120. Accordingly, after the scan is done, the confocal signal data generated during the scan can be used to determine the reflectivity of target material 120, which can be used to determine the thickness of target material 120.

In some embodiments, the property being measured is distance (e.g., displacement) corresponding to a height measurement of target material 120. For example, the distance can be a distance between target material 120 and a reference point. In some embodiments, measuring distance includes obtaining a corrected confocal sensor signal based on the output of the scan, and using a peak-finding method to measure the distance based on the corrected confocal sensor signal. Further details regarding measuring thickness and distance will now be described below with reference to FIG. 2.

Figure 2:
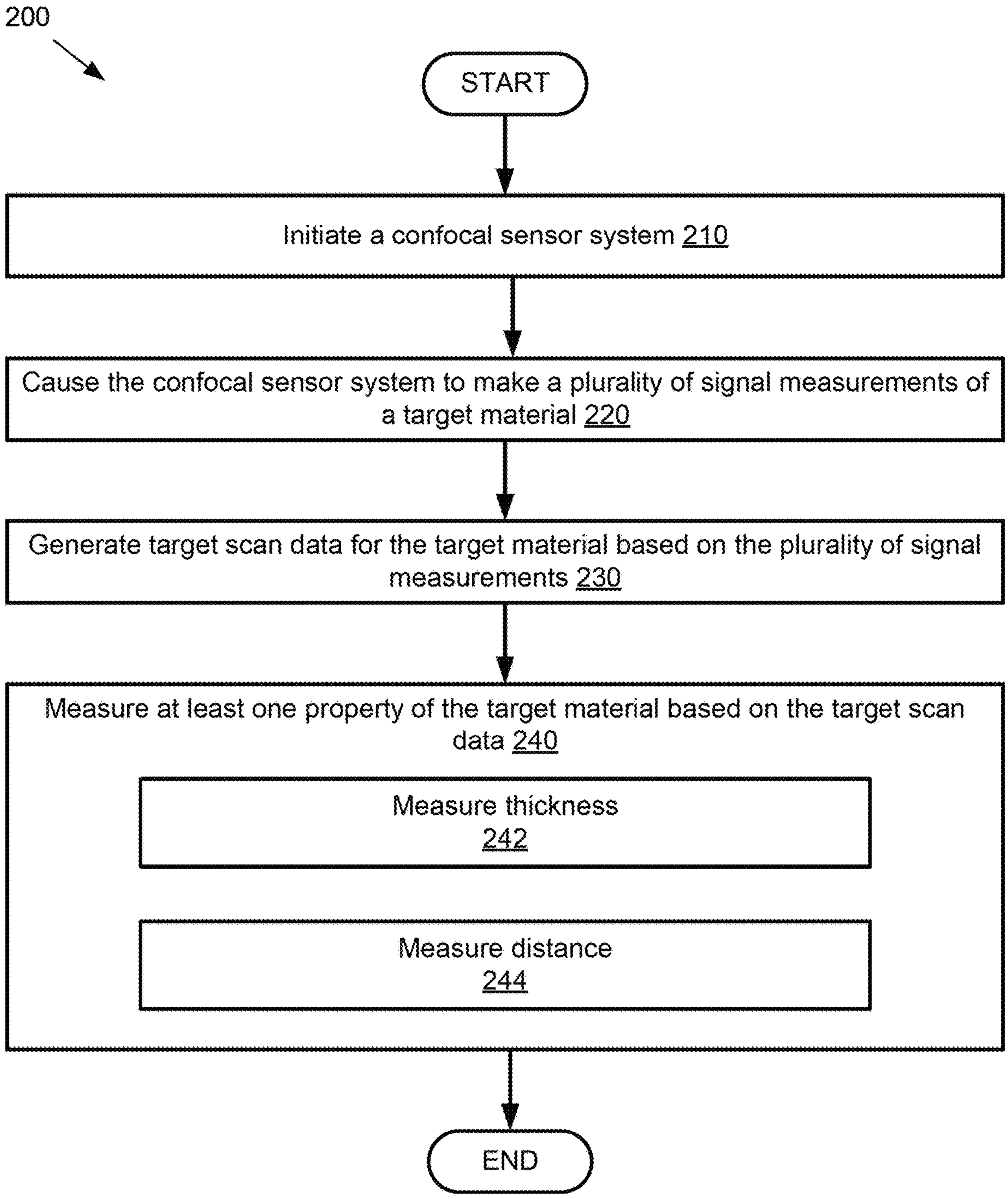
FIG. 2 is a flow diagram of a method to implement a multi-purpose confocal sensor system, according to some embodiments.

FIG. 2 is a flow diagram of a method 200 to implement a multi-purpose confocal sensor system, according to some embodiments. Method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 300 is performed by at least one processing device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, processing logic initiates a confocal sensor system. The confocal sensor system can include at least one confocal sensor (e.g., similar to confocal sensor 110 of FIG. 1). Initiating the confocal sensor system can include obtaining calibration scan data. More specifically, the calibration scan data can be obtained for a calibration material of a calibration substrate (e.g., calibration wafer). In some embodiments, the calibration material includes bare silicon (Si). Obtaining the calibration scan data can be generated using the confocal sensor system. In some embodiments, obtaining the calibration scan data includes receiving calibration scan data previously generated using the confocal sensor system. In some embodiments, obtaining the calibration scan data includes causing the confocal sensor system to generate the calibration scan data. For example, obtaining the calibration scan data can include causing an optical signal generator (e.g., optical signal generator 140 of FIG. 1) to generate an optical signal, and receiving the calibration scan data from an optical detector (e.g., optical detector 180 of FIG. 1). For example, the calibration scan data can be performed a single time to generate a system calibration graph (e.g., system calibration curve). The calibration scan data can be a function of, e.g., optical signal emission, optical path transmission, optical detector responsivity and calibration material reflectivity. The calibration scan data obtained at operation 210 can include confocal signal intensity data for the calibration material, as a function of wavelength. An example of calibration scan data will be described below with reference to FIG. 3A.

At operation 220, processing logic causes the confocal sensor system to make a plurality of signal measurements of a target material and, at operation 230, processing logic generates target scan data for the target material based on the plurality of signal measurements. For example, the target material can be included in a target substrate (e.g., target wafer). Causing the confocal sensor system to make the plurality of signal measurements of the target material can include causing the optical signal generator to generate an optical signal, and receiving the target scan data from the optical detector. The target scan data generated at operation 230 can include confocal signal intensity data for the target material, as a function of wavelength.

In some embodiments, causing the confocal sensor system to make a plurality of signal measurements of a material (e.g., of the calibration material and/or the target material) includes causing a scan operation to be performed along a given direction perpendicular to the plane of the target material (e.g., the vertical axis or z-axis). The scan operation can be performed by moving the material relative to the confocal sensor at a constant or near-constant velocity along the direction perpendicular to the plane of the material. For example, processing logic can cause a stage (e.g., stage 125 of FIG. 1) to move the material at a constant or near-constant velocity relative to the confocal sensor along the direction perpendicular to the plane of the target material. More specifically, the confocal sensor can make measurements at respective locations along the material while moving the scan location at a constant or near-constant velocity, starting from an initial scan location and ending at a final scan location. The confocal sensor can be used to collect data at an approximately fixed sample rate to ensure equal-distant sampling as the position along the direction perpendicular to the plane of the substrate is changing. After the scan is done, processing logic can use the confocal sensor signal to determine the reflectivity of the material, which can be used to determine thickness, distance, etc.

At operation 240, processing logic measures at least one property of the target material based on the target scan data. In some embodiments, processing logic measures at least one property of the target material based on the target scan data and the calibration scan data. More specifically, the at least one property is at least one property of the target material.

In some embodiments, measuring the at least one property at operation 240 includes measuring thickness at operation 242. For example, as the plurality of signal measurements are made at operation 220, the confocal signal detected by the optical detector will change due to the reflectivity of target material, with the reflectivity of target material changing as a function of thickness of target material. Accordingly, the target scan data can be used to determine the reflectivity of target material, which can be used to determine the thickness of target material.

The target scan data can include multiple confocal sensor signals, where each confocal signal corresponds to a respective wavelength detected by the optical detector. Measuring the thickness at operation 242 can include combining the measurements to generate aggregated measurement data. In some embodiments, combining the confocal sensor signals to generate the aggregated measurement data includes summing (e.g., averaging) the confocal sensor signals. The aggregated measurement data can be a function of, e.g., optical signal emission, optical path transmission, optical detector responsivity and calibration material reflectivity. An example of aggregated measurement data is described below with reference to FIG. 3A.

Measuring the thickness at operation 242 can further include determining the absolute reflectivity of the target material based on aggregated measurement data and the calibration scan data. More specifically, it is assumed that the absolute reflectivity of the calibration material (e.g., bare Si) is known, and the reflectivity of the target material can be indirectly determined using the aggregated measurement data, the calibration scan data, and the reflectivity of the calibration material. For example, if the calibration scan data (e.g., graph or curve) is represented by the letter "A" and the aggregated measurement data (e.g., graph) is represented by the letter "B", and the reflectivity of the calibration material is represented by $R_C$ then the absolute reflectivity of the target material, $R_T$, can be determined as $$\frac{B}{A/R_C}.$$

For example, as will be described below with reference to FIG. 3B, the absolute reflectivity of the target material can be represented by a graph depicting absolute reflectivity of the target material as a function of wavelength.

Measuring the thickness at operation 242 can further include determining the thickness of the target material based on the absolute reflectivity of the target material. For example, the absolute reflectivity of the target material can be mapped to a model reflectivity of the target material (e.g., model graph or curve) using a fitting method. The model reflectivity of the target material can be associated with (e.g., mapped to) a particular thickness for the target material, which can be predetermined through experimentation.

In some embodiments, measuring the at least one property at operation 240 includes measuring distance (e.g., displacement) at operation 242. For example, measuring distance can include obtaining a corrected signal, and using a peak-finding method to determine the distance based on the corrected signal. In some embodiments, obtaining the corrected signal includes selecting confocal sensor data obtained a particular scan of the target material, and dividing the selected confocal sensor data by the aggregated measurement data to generate the corrected signal. The corrected signal can remove a thin film effect of the shape of the peak of a confocal sensor signal. The particular scan can correspond to a scan location between the initial scan location and the final scan location. For example, the scan location can be a midpoint location between the initial scan location and the final scan location.

Figure 3A:
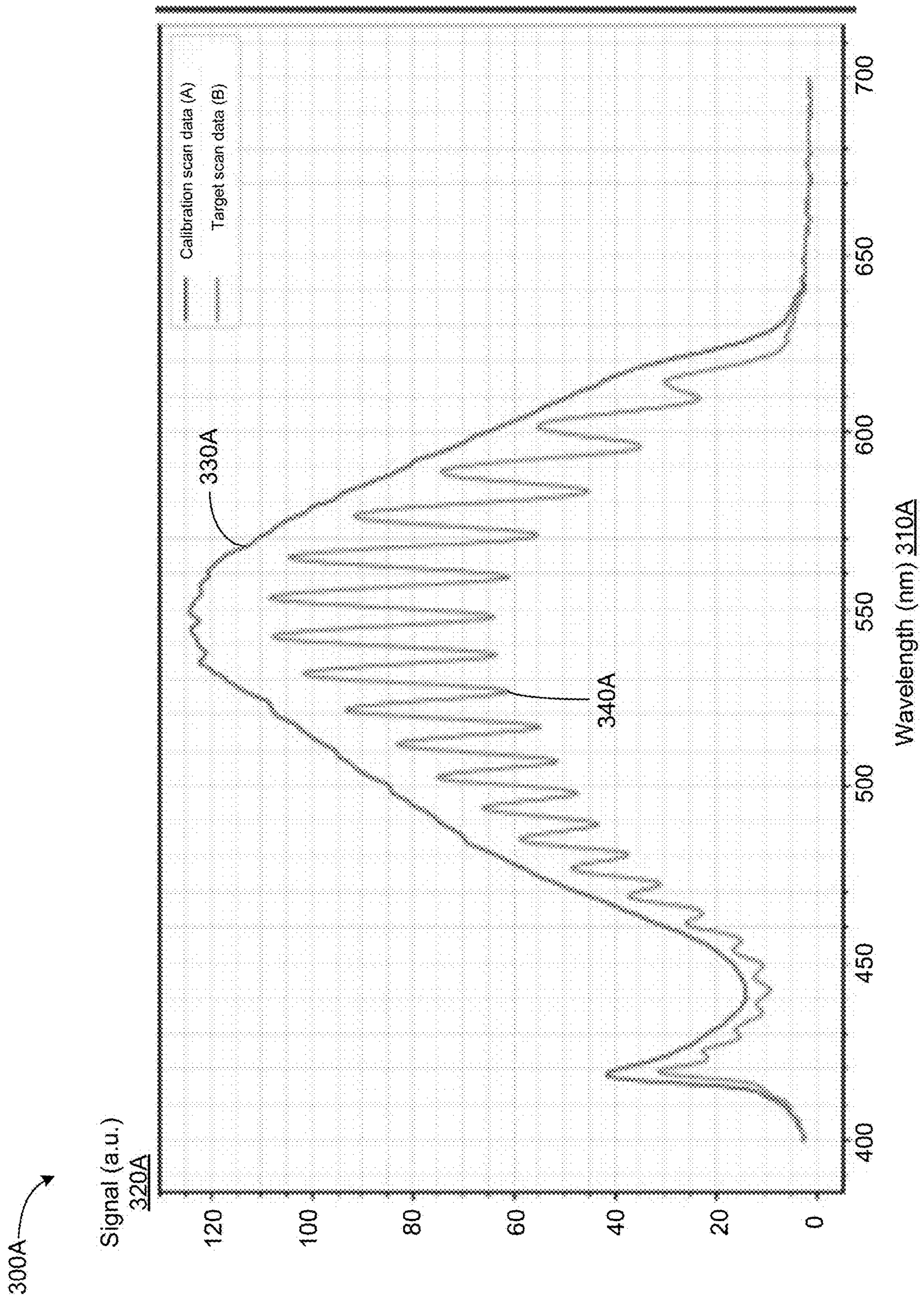
FIG. 3A is a graph illustrating example calibration scan data of a calibration material and example target scan data of a target material, each generated using a confocal sensor system, according to some embodiments.

FIG. 3A is a graph 300A illustrating example calibration scan data of a calibration material and example target scan data of a target material, each generated using a confocal sensor system, according to some embodiments. Graph 300A includes x-axis 310A corresponding to optical signal wavelengths in nanometers (nm) and y-axis 320A corresponding to confocal sensor signal ("signal") measurements in arbitrary units (a.u.). Graph 300A depicts plot 330A of calibration scan data (A) corresponding to a calibration material (e.g., bare Si) and plot 340A of target scan data (B) corresponding to a target material. More specifically, plot 340A shows aggregated measurement data generated by combining confocal sensor signals across multiple wavelengths, as described above with reference to FIG. 2.

Figure 3B:
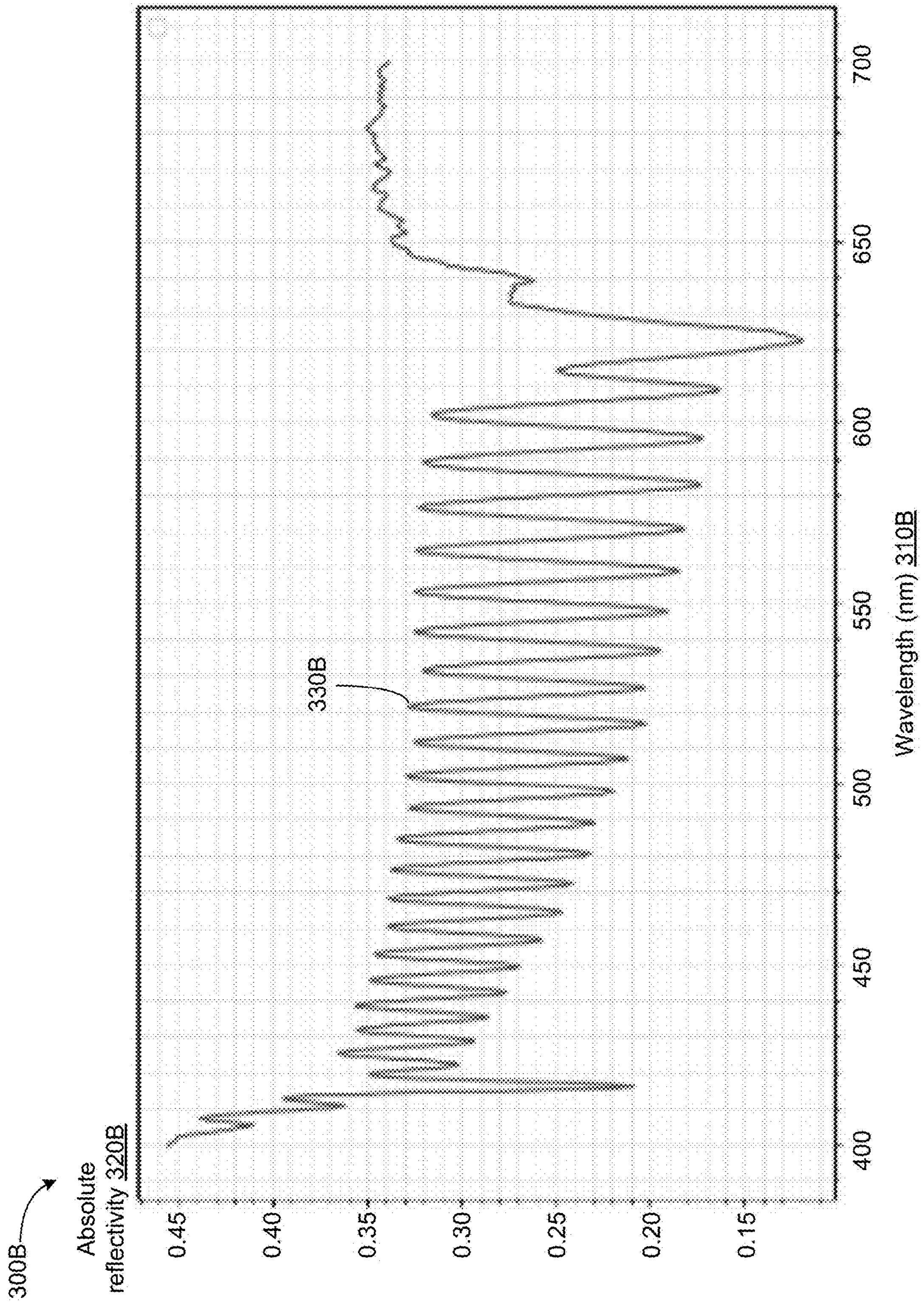
FIG. 3B is a graph illustrating an example absolute reflectivity of a target material determined using calibration scan data and target scan data, according to some embodiments.

FIG. 3B is a graph 300B illustrating example absolute reflectivity of a target material determined using calibration scan data and target scan data, according to some embodiments. Graph 300B includes x-axis 310B corresponding to optical signal wavelengths (nm) and y-axis 320B corresponding to absolute reflectivity. Graph 300B depicts plot 330B of the absolute relativity of the target material as a function of wavelength. Further details regarding determining absolute reflectivity are described above with reference to FIG. 2.

Figure 3C:
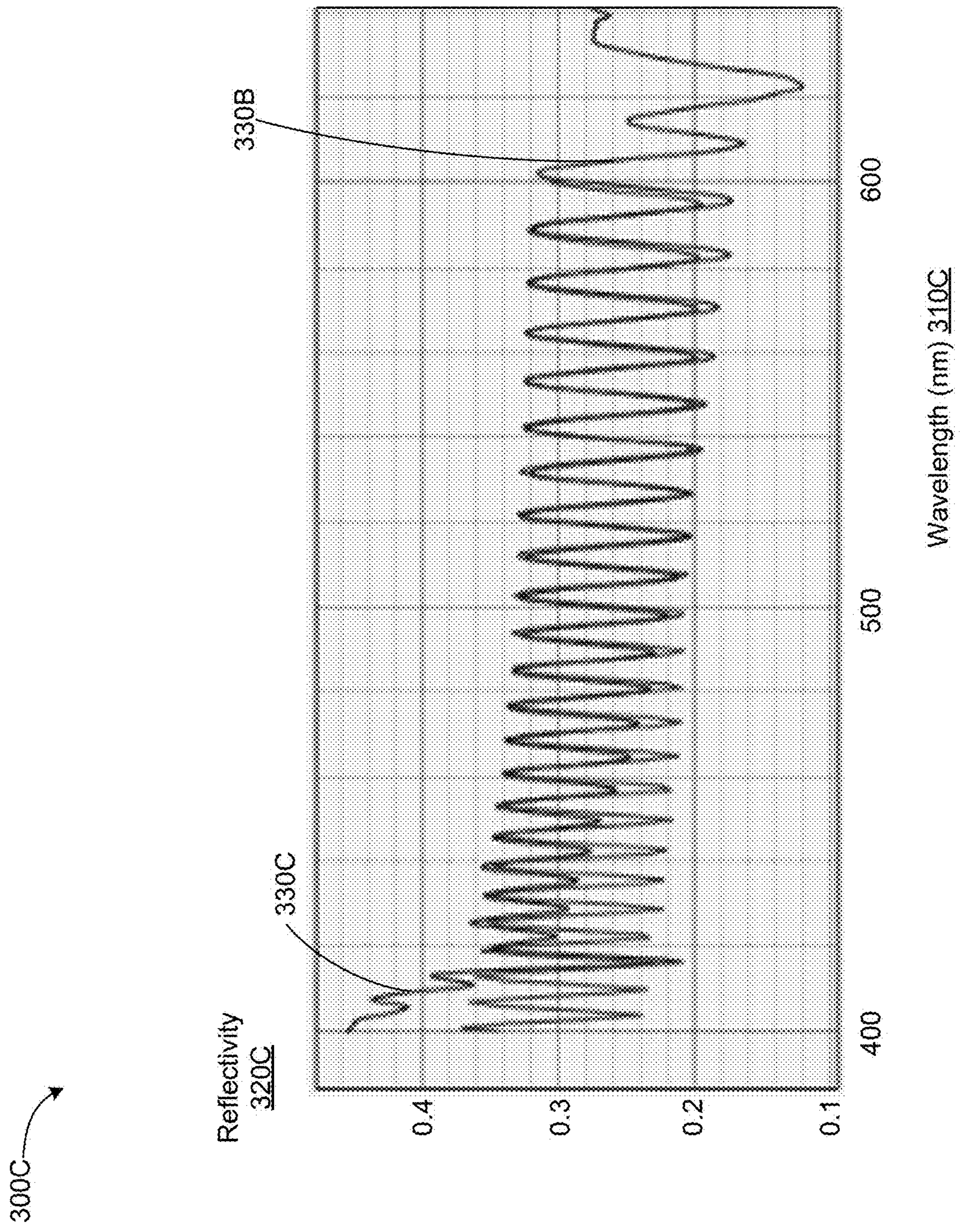
FIG. 3C is a graph illustrating an example modeling of reflectivity of a target material based on absolute reflectivity of the target material, according to some embodiments.

FIG. 3C is a graph 300C illustrating an example modeling of reflectivity of a target material based on the absolute reflectivity of the target material, according to some embodiments. Graph 300C includes x-axis 310C corresponding to optical signal wavelength (nm), and y-axis 220C corresponding to reflectivity. Graph 300C depicts plot 330B of the absolute relatively of the target material from FIG. 3B fitted to model relativity of the target material as depicted by plot 330C.

Figure 4:
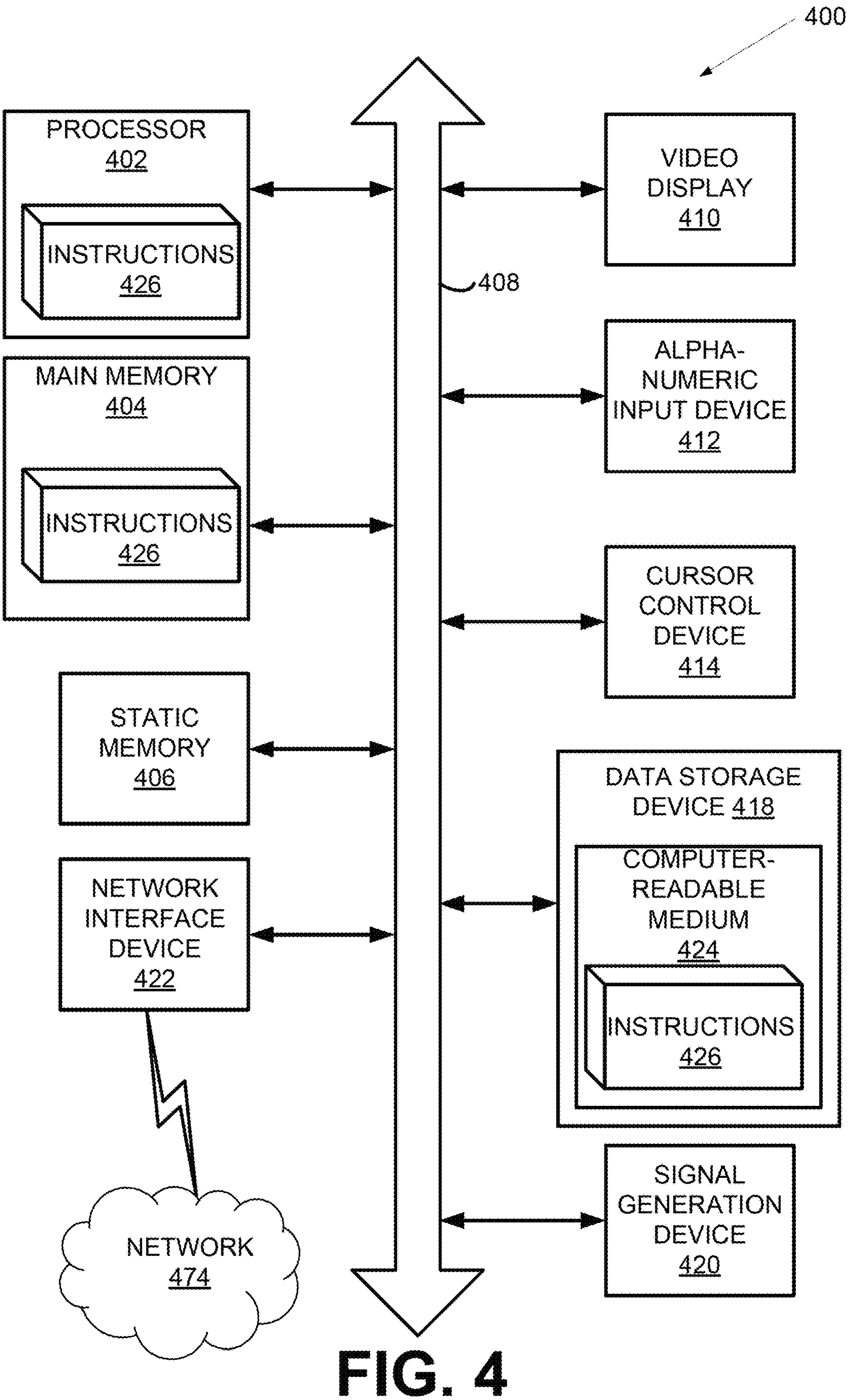
FIG. 4 is a block diagram illustrating a computer system, according to certain embodiments.

FIG. 4 is a block diagram illustrating a computer system 400, according to some implementations of the present disclosure. In some implementations, computer system 400 can be connected (e.g., via a network, such as a Local Area Network (LAN), an intranet, an extranet, or the Internet) to other computer systems. Computer system 400 can operate in the capacity of a server or a client computer in a client-server environment, or as a peer computer in a peer-to-peer or distributed network environment. Computer system 400 can be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 400 can include a processing device 402, a volatile memory 404 (e.g., Random Access Memory (RAM)), a non-volatile memory 406 (e.g., Read-Only Memory (ROM) or Electrically-Erasable Programmable ROM (EEPROM)), and a data storage device 416, which can communicate with each other via a bus 408.

Processing device 402 can be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 400 can further include a network interface device 422 (e.g., coupled to network 474). Computer system 400 also can include a video display unit 410 (e.g., an LCD), an alphanumeric input device 472 (e.g., a keyboard), a cursor control device 414 (e.g., a mouse), and a signal generation device 420.

In some implementations, data storage device 416 can include a non-transitory computer-readable storage medium 424 on which can store instructions 426 encoding any one or more of the methods or functions described herein, including instructions corresponding to components of FIG. 1 and for implementing methods described herein.

Instructions 426 can also reside, completely or partially, within volatile memory 504 and/or within processing device 402 during execution thereof by computer system 400, hence, volatile memory 404 and processing device 402 can also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "performing," "providing," "obtaining," "causing," "selecting," "determining," "generating," "using," "measuring," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and cannot have an ordinal meaning according to their numerical designation.

Examples described herein also relate to an apparatus for performing the methods described herein. This apparatus can be specially constructed for performing the methods described herein, or it can include a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

causing a confocal sensor system to make a plurality of signal measurements of a target material, each signal measurement of the plurality of signal measurements corresponding to a respective distance of a plurality of distances between a confocal sensor of the confocal sensor system and the target material;

generating target scan data for the target material based on the plurality of signal measurements;

selecting a signal measurement of the plurality of signal measurements to obtain a selected signal measurement, wherein the selected signal measurement corresponds to a signal measurement taken at a midpoint location between an initial location of a plurality of locations and a final location of the plurality of locations;

generating a corrected signal measurement based on the target scan data and the selected signal measurement; and determining a distance to the target material using the corrected signal measurement.

2. The method of claim 1, wherein the target material has a thickness that ranges between about 0.2 micrometer (μm) to about 20 μm.

3. The method of claim 1, wherein the target material has a thickness that is less than or equal to about 10 nanometers (nm).

4. The method of claim 1, wherein the target scan data comprises aggregated signal measurement data generated by combining the plurality of signal measurements.

5. The method of claim 1, further comprising measuring a thickness of the target material.

6. The method of claim 5, wherein measuring the thickness of the target material comprises:

determining a reflectivity of the target material based on the target scan data; and determining the thickness of the target material based on the reflectivity of the target material.

7. The method of claim 6, further comprising obtaining calibration scan data for a calibration material, wherein determining the reflectivity of the target material further comprises indirectly measuring the reflectivity of the target material based on the target scan data and the calibration scan data.

8. The method of claim 6, wherein determining the thickness of the target material further comprises mapping the reflectivity of the target material to a model reflectivity of the target material, and wherein the model reflectivity of the target material corresponds to the thickness of the target material.

9. The method of claim 1, wherein the target material is disposed on a stage having three degrees of freedom of motion, and wherein causing the confocal sensor system to make the plurality of signal measurements comprises causing the stage to move the target material to make each signal measurement at the respective distance.

10. A system comprising:

a confocal sensor system comprising:

a confocal sensor comprising an optical detector; and a stage to support a target material of a substrate, the stage to move with at least three degrees of freedom; and at least one processing device operatively coupled to a memory, wherein the memory stores instructions that, when executed by the at least one processing device, cause the at least one processing device to:

cause the confocal sensor system to make a plurality of signal measurements of the target material, each signal measurement of the plurality of signal measurements corresponding to a respective distance of a plurality of distances between the confocal sensor and the target material;

generate target scan data for the target material based on the plurality of signal measurements;

select a signal measurement of the plurality of signal measurements to obtain a selected signal measurement, wherein the selected signal measurement corresponds to a signal measurement taken at a midpoint location between an initial location of a plurality of locations and a final location of the plurality of locations generate a corrected signal measurement based on the target scan data and the selected signal measurement; and determine a distance to the target material using the corrected signal measurement.

11. The system of claim 10, wherein the target material has a thickness that ranges between about 0.2 micrometer (μm) to about 20 μm.

12. The system of claim 10, wherein the target material has a thickness that is less than or equal to about 10 nanometers (nm).

13. The system of claim 10, wherein the at least one processing device is further configured to measure a thickness of the target material, and wherein, to measure the thickness of the target material, the at least one processing device is further to:

determine a reflectivity of the target material based on the target scan data; and determine the thickness of the target material based on the reflectivity of the target material.

14. The system of claim 13, wherein the at least one processing device is further to obtain calibration scan data for a calibration material, and wherein, to determine the reflectivity of the target material, the at least one processing device is further to indirectly measure the reflectivity of the target material based on the target scan data, the calibration scan data, and a reflectivity of the calibration material.

15. The system of claim 13, wherein, to determine the thickness of the target material, the at least one processing device is further to map the reflectivity of the target material to a model reflectivity of the target material, and wherein the model reflectivity of the target material corresponds to the thickness of the target material.

16. The system of claim 9, wherein, to cause the confocal sensor system to make the plurality of signal measurements, the at least one processing device is further to cause the stage to move the target material to make each signal measurement at the respective distance.

17. A method comprising:

identifying a selected signal measurement of a plurality of signal measurements, each signal measurement of the plurality of signal measurements corresponding to a respective distance of a plurality of distances between a confocal sensor of a confocal sensor system and a target material, wherein the selected signal measurement corresponds to a signal measurement taken at a midpoint location between an initial location of a plurality of locations and a final location of the plurality of locations;

generating a corrected signal measurement based on the signal measurement and target scan data for the target material; and determining a distance to the target material using the corrected signal measurement.

18. The method of claim 17, further comprising generating the target scan data for the target material based on the plurality of signal measurements.

19. The method of claim 17, wherein the target scan data comprises aggregated signal measurement data generated by combining the plurality of signal measurements.

20. The method of claim 17, further comprising:

obtaining calibration scan data for a calibration material;

determining a reflectivity of the target material based on the target scan data and the calibration scan data; and mapping the reflectivity of the target material to a model reflectivity of the target material, wherein the model reflectivity of the target material corresponds to a thickness of the target material.

* * * * *